Nov. 22, 1966 R. T. KENDALL 3,286,951
RECOVERY SYSTEM
Filed Sept. 27, 1963 2 Sheets-Sheet 1
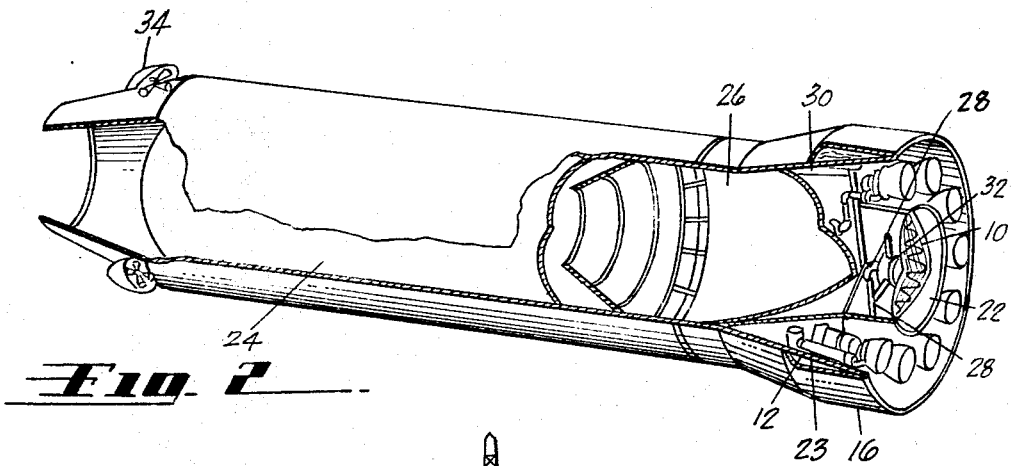
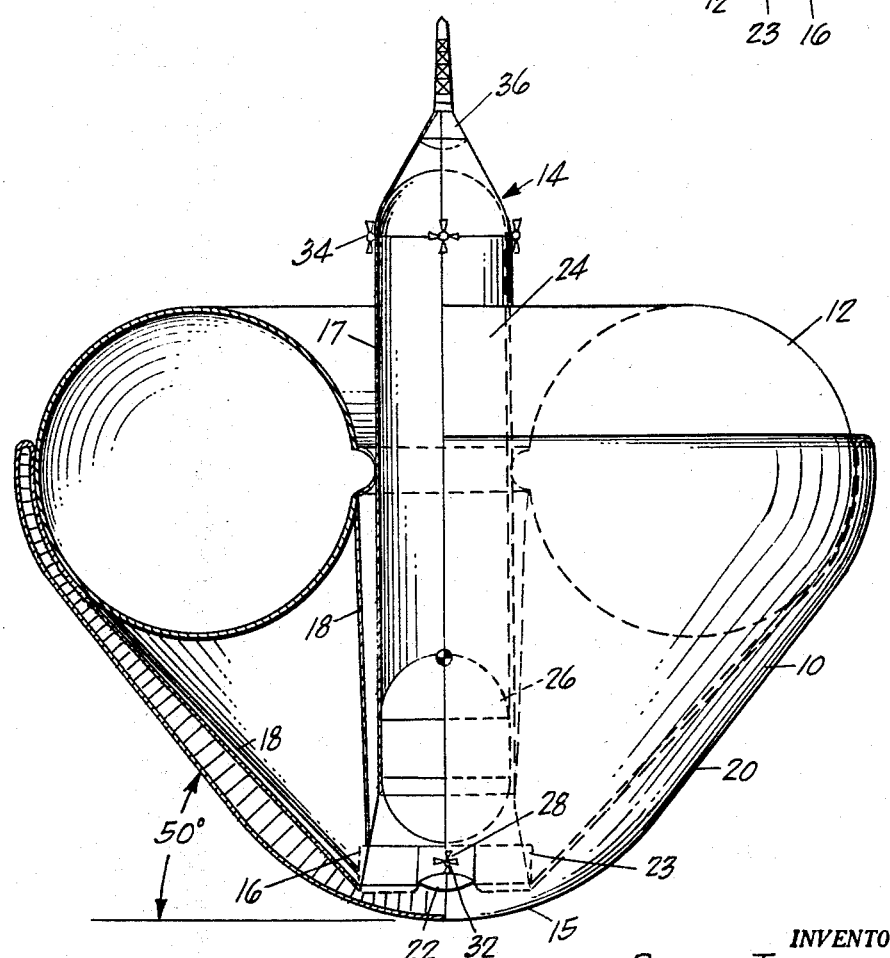
INVENTOR.
ROBERT T. KENDALL
BY
Leon D. Rosen
ATTORNEY Nov. 22, 1966 — R. T. KENDALL — 3,286,951
RECOVERY SYSTEM Filed Sept. 27, 1963

INVENTOR.
ROBERT T. KENDALL
BY Leon D. Rosen
ATTORNEY

United States Patent Office 3,286,951
Patented Nov. 22, 1966

3,286,951
RECOVERY SYSTEM
Robert T. Kendall, Palos Verdes Estates, Calif., assignor to Douglas Aircraft Company, Inc., Santa Monica, Calif.
Filed Sept. 27, 1963, Ser. No. 312,043
10 Claims. (Cl. 244—1)

This invention relates to a system for recovering objects from great distances above the earth's surface and landing them safely onto the earth.

The recent developments of space technology which have enabled the placing of objects in orbit around the earth or at high altitudes above the earth has generated a need for a recovery system to return objects to the earth safely. Various schemes have been proposed and actually employed; for example, rigid metal heat shields have been used to protect an object to be recovered against the heat of air friction, retro-rockets have been used to reduce the rate of descent of objects through the atmosphere and parachute systems have been used to reduce descent velocity during the last stages of descent. The prime disadvantage encountered in the use of prior systems is that they comprised heavy and bulky equipment. This invention provides a recovery system which is both lightweight and compactly storable.

The system of this invention employs an inflatable heat shield, generally defining a blunt-nose cone or bowl, adapted for disposal around an object to be recovered. The shield serves to protect the object against the heat of reentry, slow its rate of descent through the upper atmosphere, cushion its impact with the earth or water upon landing and protect it from water immersion if the landing should occur on water. In some embodiments of the invention a toroid-shaped balloon is provided to stiffen the shield and to supply bouyancy to reduce the rate of descent of the object through the lower atmosphere and settle the object gently on the earth's surface, preferably on water. Both the heat shield and balloon of the invention are inflatable and can thus be stored very compactly to enable their being carried with or to an object to be recovered with a minimum expenditure of energy.

The system of the invention is useful in the recovery of any of a variety of objects from outer space or the upper reaches of the atmosphere. One of its most important uses is in the recovery of rocket boosters. Rocket boosters used to carry satellites or other objects to the upper reaches of the atmosphere or beyond are generally not recovered but are allowed to fall to the earth after use. Such a procedure is very wasteful inasmuch as the boosters are very expensive and contain a large amount of equipment that could be re-used. The primary reason why boosters are not recovered is that prior recovery systems were so heavy and bulky that the cost of carrying them with the booster offset the savings in recovering the booster. Furthermore, damage to the booster resulting from landing impact or immersion in water was often extensive. The present invention provides a recovery system which is lightweight and compact so that it is practical to include it with a rocket booster to enable the booster to be recovered in a largely undamaged state and re-used. By utilizing a recoverable booster it is economical to lift objects into orbit using a single stage booster. A single stage booster is generally larger than a multistage system and prohibitively expensive unless it is reusable. However, its use results in a booster system more reliable than heretofore, inasmuch as a rocket sytem which need be started only once, and only while resting on the earth, is considerably more reliable than a booster system employing several states, each of which must be separately started.

Another important use of the invention is as a compactly storable space lifeboat for enabling an astronaut to descend from an earth orbit to the earth. The vehicle is normally carried deflated like an inflatable lifeboat, together with tanks of compressed gas. When the vehicle must be used, the gas in the tanks is allowed to inflate the vehicle into a blunt-nosed cone shape which protects the astronaut during descent, impact and recovery.

Accordingly, one object of the present invention is to provide a lightweight and compactly storable recovery system for the recovery of objects from the upper reaches of the earth's atmosphere and beyond.

Another object of the present invention is to provide a buoyant heat shield and assembly for the recovery of objects from far above the earth's surface.

A further object of the present invention is to provide a recovery system for enabling the safe landing of objects recovered from outer space onto water.

A still further object of the present invention is to provide a compactly storable space lifeboat for enabling the safe descent of a person from far above the earth.

These and other objects and a more complete understanding of the present invention may be had by reference to the following description and claims taken in conjunction with the accompanying drawings in which:

FIGURE 1 is a sectional elevation view of a deployed recovery system shown as used to recover a spent rocket booster.

FIG. 2 is a side elevational sectional view of an undeployed recovery system shown stored in a rocket booster prior to inflation.

Figure 3:
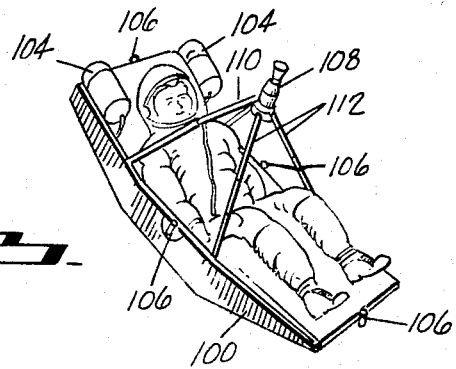
FIG. 3 is a pictorial representation of a space lifeboat constructed in accordance with the present invention, shown prior to inflation.

With reference to the drawings wherein like numerals refer to like references, the embodiment of the present invention shown in FIGS. 1 and 2 for a rocket booster recovery system comprises an inflatable heat shield portion 10 defining a blunt-nosed cone for protecting recovered objects against heat developed during the first stages or recovery and a torodidal gas bag 12 for providing buoyancy to reduce the rate of descent of the system during the final descent through the earth's atmosphere and also to brace and support the recovered object. The object to be recovered is a spent or used rocket booster 14 having its aft end 16 resting against the nose portion 15 of the heat shield and having cylindrical side walls 17 held by the radially inner portion of the toroidal gas bag 12. Support webs 18 serve to hold the toroidal gas bag 12 to the booster 14 and heat shield 10.

The inflatable heat shield 10 is fabricated of a high temperature resistant fabric such as stainless steel wire coated with a silicon elastomer to make it gas tight, and is fabricated so that when inflated it will assume a blunt-nosed cone configuration, the particular cone shape shown having sides sloping at an angle of about 50°. The cone shaped heat shield of FIG. 1 is used to provide a protective shape which can encompass a large volume gas bag which provides buoyancy, and the shield includes a blunt nose portion 15 to reduce heating on any small area such as would occur if a pointed nose were used. However, other shapes similar to a cone and including a more pointed nose portion of strong and very heat resistant material may be used.

The gas bag 12 is constructed of a gas tight flexible material such as, for example, tensilized dacron impregnated with a low permeability silicon sealant. Numerous support webs 18 of a material such as tensilized dacron hold the gas bag to the heat shield portion 10 and the booster 14. One end of each web 18 is tied to the skirt at the aft end 16 of the rocket booster, the opposite end being attached to either the radially inner or outer portions of the bag 12. The webs 18 transmit the upward or buoyant force of the gas bag to the booster and heat shield and provide lift to slow the descent of the system during the last stages of descent through the earth's atmosphere. Several of the webs 18 include hollow tubes which serve to carry inflating gas from a gas generator or heater 32 to the gas bag 12.

The gas used to inflate the heat shield 10 and gas bag 12 is generally obtained from the fuel tanks of the rocket booster. For example, if liquid hydrogen and liquid oxygen are used as fuel, a small additional amount of each fuel, and especially of hydrogen, may be provided for inflating the recovery system. Additionally, helium gas which is generally provided to pump fuels in many types of systems, may be used to at least partially inflate the system. A large proportion of lighter-than-air gas is necessary to supply buoyancy, and if insufficient gas is obtainable from the fuel tanks or pumping gas tanks, a separate supply of liquid hydrogen, helium or the like may be carried in addition. In the presently described system, liquid hydrogen is one of the fuels and a sufficient amount is carried to provide gas for inflating.

The inflatable heat shield 10 is filled with gas obtained from the liquid hydrogen remaining in the hydrogen tank 24 after the rocket is shut off. The gas bag 12 is also filled with hydrogen gas obtained from the tank. Hydrogen is preferably used to inflate the gas bag, because it is the lightest of all gases and thus assures a large buoyancy in the gas bag 12. The reason for providing gas in the inflatable heat shield 10 is to inflate it to a rigid shape and any gas would suffice for this purpose, even gases which are heavier than air. Oxygen could be used though it is very flammable when heated. Helium pump gas may be used as explained hereinbefore, if there is a sufficient quantity available.

The booster is generally positioned with its aft or nozzle end 16 adjacent the nose portion 15 of the heat shield. The purpose of such positioning is to place the center of gravity of the booster near the nose of the shield so that the system is stable during descent and does not tend to tip over. The center of gravity of an empty rocket booster is generally near the aft end where the nozzles and associated equipment are located.

A booster recovery system may be stored in a rocket booster during its ascent in a manner shown in FIG. 2. The inflatable heat shield 10 is stored in a compartment 22 located at the aft end of the booster, in an uninflated state. The compartment 22 is situated at the center of the end of the booster while the rocket engines and nozzles thereof are clustered about it. The gas bag 12 is stored in an annular compartment 23 which surrounds the aft end of the rocket. The bag 12 is released from the compartment 23 by its gradual inflation, thereby outgrowing the confines of the annular chamber and exteriorly encompassing the booster. A more retailed explanation of the gradual bag inflation will follow. The booster is propelled by a hydrogen-oxygen propellant system and carries a liquid hydrogen tank 24 and a liquid oxygen tank 26. A fuel line 30 connects the liquid hydrogen tank 24 to the shield and gas bag 10 and 12. A heater 32 is utilized for heating liquid hydrogen to enable the more rapid filling of the inflatable structures 10 and 12 and is connected to the line 30. Such a heater is often not required because hydrogen is automatically evaporated by the heat of the sun. The heater or gas provider 32 functions by combining oxygen and hydrogen to produce steam which is used to heat the remaining liquid into gas. The hydrogen heater apparatus 32 includes a small conduit 28 leading to the oxygen tank 26 for carrying oxygen to the heater.

The rocket booster shown in the drawings is adapted for the boosting of a payload into orbit using only one stage of booster. The system, including the rocket booster with an inflatable heat shield and gas bag stowed in a manner shown in FIG. 2 is launched from a rocket launch pad in the same manner as any ordinary rocket is launched. After reaching a sufficient altitude, the direction in which thrust is applied is so controlled that the booster is placed in orbit. A payload 36 is then ejected at a low velocity sufficient to separate it from the booster and eliminate interference between them.

Preparatory to recovery, the booster is "parked" in orbit until weather and other conditions at the recovery site are favorable for recovery. The booster may now be recovered during any period wherein it approaches the recovery site. While orbiting, the remaining liquid hydrogen is partially heated, primarily by the sun, and this causes boil-off of gases. These gases are conducted to the inflatable heat shield 10 and gas bag 12 to cause their inflation by means of flexible conduits of rubberized fabric or other material, disposed along or integral with several of the webs 18. Evaporation of the gases is fairly slow and the gas bag 12 is deployed very gradually, thereby minimizing the possibility of rupture from sudden pressure shock. As the bag is inflated boil-off is diminished because of the increased vapor pressure. Vents are additionally provided to allow gases to escape in case so much gas is evaporated that the gas bag 12 and heat shield 10 are in danger of bursting.

Although the heat shield and gas bag may be filled sufficiently with gas to achieve their final desired shape, the actual gas pressures within them are generally considerably less than that which is needed during passage through the lower regions of the earth's atmosphere where ambient air pressure is considerable. Thus, means are provided for causing the rapid evaporation of additional gases when needed to inflate the heat shield and bag after the beginning of the descent of the system. The hydrogen heater which combines oxygen and hydrogen to produce steam, supplies the heat necessary to vaporize the liquids.

At a time when weather and other conditions are favorable for recovery a radio signal is transmitted from the earth which, when received by a receiver (not shown) on the booster, causes the ignition of vernier and control engines 34 which provide the necessary thrust to obtain deorbiting velocity and cause the start of descent through the earth's atmosphere. As the deployed system starts to return through the upper atmosphere the large area of the heat shield provides considerable drag and slows the vehicle. The temperature on the outer surface of the heat shield 10 reaches a high level such as 1500° F., but the stainless steel wire cloth or other fabric of the outer surface is capable of withstanding such temperatures. The forces and heating on the heat shield are kept to a minimum by causing the system to re-enter the atmosphere at a small angle such as 1.5 degrees. This is accomplished by decreasing the orbital velocity by only about 500 feet per second. The maximum deceleration is then estimated to be about 7 g's while the the maximum temperature on the surface of the heat shield is approximately 1500 degrees Fahrenheit. In order to rigidize the heat shield 10 and enable it to withstand aerodynamic pressure, the internal pressure within the shield is programmed as a function of aerodynamic pressure on its surface or of acceleration. The maximum pressure encountered on the outer surface during the initial stages of recovery is about 35 pounds per square foot. The internal shield pressure is kept slightly greater than this—about 0.5 pound per square inch greater. The pressure during re-entry is on the forward surface of the shield and tends to collapse it against the booster 14. However, the gas bag 12 holds the periphery of the shield 10 away from the booster thereby maintaining the cone shape of the shield. Inflating gas is generated during the beginning of descent to provide the required pressure. After the maximum deceleration and pressure on the shield is reached and passed, valves are allowed to open to permit the leakage of gases and the decrease of inflating pressure in the heat shield as the pressure on its outer surface decreases. The material of the heat shield is strong enough to withstand the considerable forces encountered during re-entry. The gas bag 12 is generally of much lighter construction and its internal pressure is generally about 0.3 pound per square inch greater than ambient. Thus, as descent is begun liquid hydrogen gas is continually evaporated to maintain the required pressure differential between internal and ambient atmospheres until the system comes quite close to the earth's surface. The ambient pressure continually increases so that the maintenance of a pressure differential is achieved merely by evaporating hydrogen at a sufficiently high rate and providing a safety valve to prevent rupture should too much gas be evaporated too soon.

As the recovery system descends into the denser regions of the earth's atmosphere the gas bag 12 begins to exert a buoyant effect to slow the rate of descent. It is generally only below 50,000 feet that the buoyant effect is appreciable. The considerable volume of the gas bag 12 which has almost no weight because it is filled with the very light gas hydrogen, exerts an upward pull which almost cancels the weight of the empty rocket booster 14, and shield and gas bag fabrics. Thus the rate of descent as the system approaches the earth's surface is very slow. Generally, the recovery of the system is so arranged that it settles on water, because damage to the booster is less likely when the system hits water than when it hits land. Furthermore the problems of towing the vehicle to a recovery building or area are reduced if towing is conducted on water.

Once the system is landed, tow lines are attached to the top and the nose of the cone. If the system has been landed on water, recovery is accomplished by attaching the tow lines to a vessel which is powerful enough to drag the system through the water to a disassembly area. The gas bag 12 and heat shield 10 are deflated and the rocket booster 14 recovered. The gas bag 12, heat shield 10 and rocket booster 14 may then be refurbished and re-used.

Although the foregoing rocket booster recovery system has been described as employing a separate heat shield and buoyancy producing bag, an integral inflatable structure may be used which performs both functions. For example, an inflatable structure defining a solid cone with a long narrow indentation for holding a booster rocket, may be used.

Figure 4:
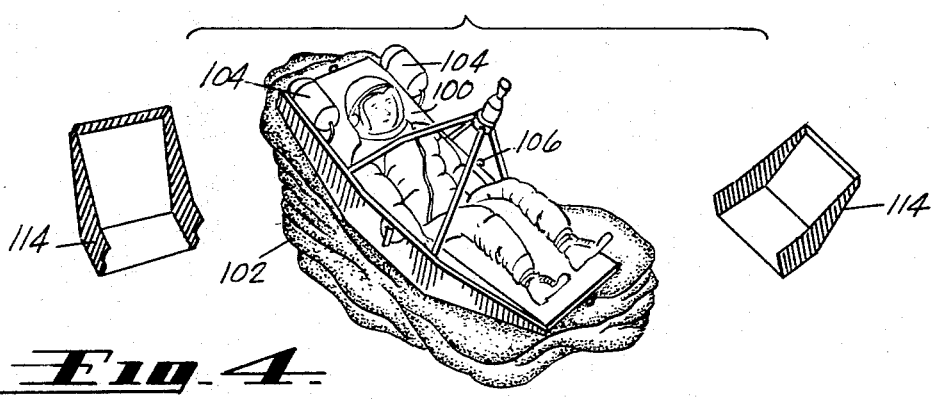
FIG. 4 is a pictorial representation of the space lifeboat of FIG. 3 shown during inflatable deployment thereof.
Figure 5:
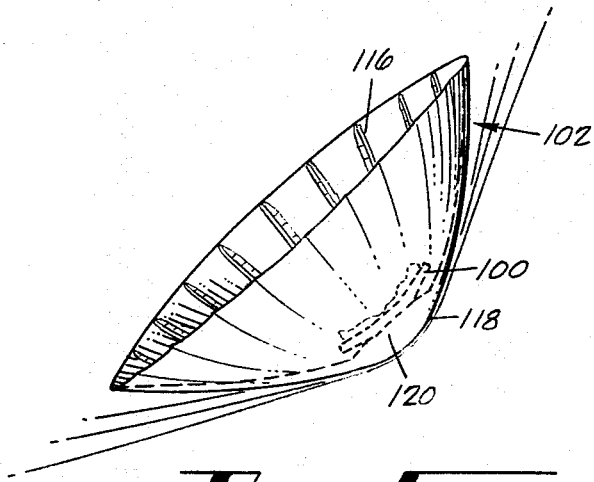
FIG. 5 is a pictorial representation of a space lifeboat shown after inflatable deployment.

Another embodiment of the present invention is a space lifeboat shown in FIGS. 3, 4, and 5 which employs a cone-shaped heat shield but generally no buoyancy bag. This embodiment generally serves as an emergency vehicle which can safely bring an astronaut from an earth orbit to the earth's surface. The vehicle is compact and may be stored in a small package. One convenient mode of storage, shown in the drawings, is in a flight seat of a spacecraft, the seat being ejectable from the spacecraft in case of an irreparable failure thereof or other emergency. The vehicle comprises a platform 100 which generally serves as a seat for an astronaut in a spacecraft. The platform 100 is hollow and contains an inflatable heat shield structure 102 and bottles of compressed gas 104 such as helium, for inflating the shield structure 102. Gas jets 106 connected to the tanks 104 are mounted at the sides of the platform and enable its orientation. A solid fuel retro-rocket 108 for reducing orbiting speed is attached to a bracket 110 which normally lies flat against the surface of the platform so that the retro-rocket 108 is situated above the head of the astronaut when the platform is used as a seat in a spacecraft. Two support rods 112 hold steady the retro-rocket 108 when it is deployed for firing.

In order to use the space lifeboat, the seat structure is ejected or otherwise deployed from a spacecraft. The astronaut then positions the retro-rocket 108 for firing by swinging it from above his head to a position in front of him, and raising the support rods 112 and locking them to the retro-rocket structure. The gas jets 106 are then fired briefly to establish a correct attitude for firing of the retro-rocket 108. A horizon sighting or similar device may be used to determine when the proper attitude is reached.

The speed of the vehicle must next be reduced to cause it to attain a suitable trajectory through the earth's atmosphere. This is accomplished by firing the retro-rocket 108. The rocket is positioned so that its line of thrust intersects the center of gravity of the vehicle. In case there is a misalignment, the astronaut can shift some of his body weight or other small weights provided for this purpose, or provisions may be made to allow for adjustment of the position of the rocket. An initial vernier burning phase of the rocket 108 is provided to allow time for performing this operation before full rocket thrust is reached.

After deorbiting speed is reached and action of the retro-rocket 108 is discontinued, it is necessary to maneuver the vehicle to the re-entry position, i.e. platform 100 which contains the heat shield 102 must face the direction of travel. Gas jets 106 are to be used for such maneuvering. Upon reaching significantly dense atmosphere, which is capable of frictionally heating the vehicle, the inflatable heat shield 102 is deployed. This is accomplished by releasing panels 114 which cover the back of the platform 100 thereby enabling the deployment of the shield, and opening a valve which allows gas from the tanks 104 to inflate the shield. The shield 102 is deployed and inflates in a manner shown in FIG. 4. As inflation is complete, the shield of the vehicle forms a shallow, blunt-nosed cone or bowl as illustrated in FIG. 5. The shield will therefore offer increased aerodynamic resistance to cause trailing thereof upon reaching the atmosphere. Therefore, it is not necessary to maneuver the vehicle, as by gas jets 106, to face the direction of travel as the device will automatically right itself to face the blunt nose of the bowl into the direction of travel. The diameter of the illustrated cone is about three times the depth; generally the diameter for any recovery systems of the types described is between one to four times the depth, a larger depth being wasteful of shield material and a smaller depth tending to result in a shield of reduced stability, for a shield of given diameter.

The shield of the vehicle is essentially a double-walled inflatable structure having a plurality of spaced, inflatable tubes 116 which stiffen the shield and help maintain its proper shape. A toroid balloon or balloon of other shape may be employed to prevent collapse of the shield under the re-entry pressures on its forward face, though such means are not necessary if the tubes 116 are stiff enough. The nose portion 118 of the inflated shield contains a large gas bubble 120 which enables a relatively soft landing of the vehicle on the earth's surface. Although a double-walled inflatable heat shield is desirable to obtain a smooth surfaced shield, a supported, single-walled uninflated shield may be used instead, one possible form of support being an umbrella-like cluster of stiffening members.

As the vehicle passes through the atmosphere, it is slowed by drag forces. The fabric of the heat shield or of just the outer portions of the vehicle is a high temperature resistant material so that it can resist the high temperatures encountered in descending. During the last stages of descent, the large area of the shield slows the vehicle so that it strikes the ground or water at a sufficiently low velocity to prevent injury to the astronaut. When the vehicle strikes the ground, the bubble 120 in the nose is compressed and absorbs shock. Additionally, a large relief valve may be provided to collapse the bubble upon impact thereby enabling the more complete absorption of impact shock and preventing bouncing. It is calculated that a space lifeboat with a man, together weighing 500 pounds, and a cone 25 feet in diameter would experience a maximum brief deceleration of about 9 g's during re-entry of the atmosphere and would strike the ground at a speed of about 20 miles per hour. The position of the astronaut as he lies on his back is the best position for a person to assume in withstanding the high decelerations encountered.

The two embodiments of the invention described herein show adaptations of the invention for a rocket booster recovery system and for a space lifeboat. It can be appreciated that the compactly storable heat shield, which is deployable to a bulbous shape such as a blunt-nosed cone or a bowl, may be used in conjunction with a variety of mechanisms for aiding a safe descent. As examples, a buoyant gas bag and a gas bubble in the nose of the shield have been shown as mechanisms for reducing shock on landing. Many other modifications and other embodiments of the invention than those specifically described herein will be apparent to those skilled in the art. Accordingly, the invention is not limited to the specific embodiments disclosed, but only as defined by the following claims.

I claim:
1. A recovery vehicle for recovering an object comprising:
   a flexible shield of heat resistant material adapted for deployment into a bulbous shape;
   an inflatable bag attached to said shield and adapted for inflatable disposal partially within the boundaries defined by said shield; and
   lighter-than-air inflation means for inflating said bag with a gas which is lighter than air, connected to the interior of said bag.
2. A recovery vehicle as defined in claim 1 wherein said bag is adapted for inflation to a shape having a sufficient volume that it has substantially as great a buoyancy as the weight of said shield, bag and object.
3. A recovery vehicle comprising:
   an inflatable heat shield including an outer face portion of high temperature resistant material, said shield adapted for gas inflation into a form having an outer portion defining a blunt-nosed cone;
   a buoyancy bag adapted for gas inflation into a toroidal-like form;
   lighter-than-air gas inflation means for inflating said buoyancy bag with a gas which is lighter than air, connected to said buoyancy bag;
   inflation means connected to said heat shield for inflating it; and
   joining means attached to said buoyancy bag, for positioning it so that when said bag and shield are inflated, said bag is nestled at least partially within the large diameter end of said shield.
4. A rocket booster recovery system comprising:
   a rocket booster;
   a gas providing means disposed within said booster for providing inflating gas;
   an inflatable heat shield including an outer face of flexible, high-temperature resistant material, said shield connected to said gas providing means and adapted for inflation thereby, and said shield stowed in an uninflated state on said booster and adapted for inflatable deployment into a cone-like shape for disposal at least partially about said booster; and
   an inflatable buoyancy bag connected to said gas providing means, and adapted for inflatable disposal within the base portion of said shield when it is deployed into a cone-like form.
5. A space lifeboat comprising:
   a platform;
   a retro-rocket system mounted on said platform and oriented so that its thrust is substantially in line with the center of gravity of said platform and all objects thereon;
   an inflatably deployable heat shield system packaged within said platform and adapted for deployment into a bowl shape wherein said platform rests within said bowl-shaped shield; and
   gas inflation means on said platform for inflatably deploying said shield.
6. A space lifeboat as described in claim 5 wherein said platform is a seat structure for supporting a person.
7. A space lifeboat as described in claim 5 wherein said shield system includes a plurality of inflatable support tubes arranged in a pattern radiating from the center of said bowl shape for stiffening said shield.
8. A recovery vehicle for recovering an object comprising:
   a shield adapted for deployment into a bulbous, bowl-like form having a diameter greater than its depth and less than four times its depth, said shield being completely constructed of a flexible material and stored in an undeployed state;
   holding means for retaining said shield and completely encasing said shield in said undeployed state; and
   deployment means for extending said shield to said bulbous, bowl-like form and at least partially encompassing said object, said deployment means being the expansion of a gas, said expansion of a gas inflating a portion of said shield thereby causing said shield to extend.
9. A recovery vehicle as defined in claim 8 and further including:
   shock absorber means positioned within said shield at the center and bottom thereof when it assumes said bowl-like form, for cushioning said object upon impact of said shield with the ground.
10. A recovery vehicle as defined in claim 8 wherein: said shield contains a multiplicity of inflatable tubes, said expansion of gas causing said tubes to become semi-rigid thereby extending said shield.

References Cited by the Examiner

UNITED STATES PATENTS

| | | | |
|---|---|---|---|
| 3,050,278 | 8/1962 | Gardner et al. | 244—138 |
| 3,118,636 | 1/1964 | Kantrowitz et al. | 244—113 |
| 3,144,219 | 8/1964 | Schnitzer | 244—1 |

FOREIGN PATENTS

| | | |
|---|---|---|
| 219,441 | 2/1910 | Germany. |

FERGUS S. MIDDLETON, *Primary Examiner.*